United States Patent [19]

Fujita et al.

[11] Patent Number: 5,090,731
[45] Date of Patent: Feb. 25, 1992

[54] STEERING WHEEL

[75] Inventors: Yoshiyuki Fujita; Katsunobu Sakane, both of Aichi, Japan

[73] Assignee: Toyoda Gosei Co., Ltd., Nishikasugai, Japan

[21] Appl. No.: 618,909

[22] Filed: Nov. 28, 1990

[30] Foreign Application Priority Data

Dec. 26, 1989 [JP] Japan ................................. 1-338943

[51] Int. Cl.⁵ ............................................. B62D 1/11
[52] U.S. Cl. ........................................ 280/777; 74/552
[58] Field of Search ............................ 280/777; 74/552

[56] References Cited

U.S. PATENT DOCUMENTS

| 1,101,417 | 6/1914 | Dover | 74/552 |
| 3,948,118 | 4/1976 | Garbin | 280/777 |
| 3,992,041 | 11/1976 | Vernocchi | 74/552 |
| 4,390,193 | 6/1983 | Strahan et al. | 280/777 |
| 4,628,761 | 12/1986 | Niwa | 74/552 |
| 4,648,164 | 3/1987 | Hyodo et al. | 280/777 |
| 4,946,194 | 8/1990 | Maeda et al. | 280/777 |
| 4,962,947 | 10/1990 | Nagata et al. | 280/777 |

FOREIGN PATENT DOCUMENTS 2729794  3/1979  Fed. Rep. of Germany .

Primary Examiner—Kenneth R. Rice
Attorney, Agent, or Firm—Cushman, Darby & Cushman

[57] ABSTRACT

A self aligning steering wheel comprising a boss portion disposed at a middle of a steering wheel ring portion, a number of spokes extending radially outward from the boss portion and connecting to the ring portion, each of the spokes including an internal spoke core member, with a ring core member being disposed in the ring portion, a boss plate is disposed at the spoke core member, the boss plate is plastically deformable to cause a plane of the ring to be at substantially right angles to an impact force line of action whenever an impact force is exerted on the ring portion, each spoke core member includes a first parallel portion which is substantially parallel to the ring plane and extends from the ring core member toward the boss to a kinked portion, a tilting portion which extends from the kinked portion to a second parallel portion, with the second parallel portion being connected to an underside portion of the boss plate.

2 Claims, 6 Drawing Sheets

STEERING WHEEL

BACKGROUND OF THE INVENTION

Field of Invention

The present invention relates to steering wheels. More particularly, the present invention relates to a steering wheel equipped with a so-called self aligning mechanism through which when an impact force is exerted on the steering wheel ring, the plane of that ring realigns so as to be substantially normal to the impact force line of action.

FIGS. 10 and 11 (Prior Art) illustrate one example of a known steering wheel WO equipped with a self aligning mechanism. One such known use of this self aligning mechanism is disclosed in Japanese Unexamined Patent publication No. sho. 60-261751.

FIG. 10 (Prior Art) illustrates a spoke portion S of the steering wheel WO connecting the boss portion B and the ring portion R. The spoke portion S is depicted as including two spokes S(1) and S(3) disposed on the left and right sides of the front and a spoke S(2) disposed at the rear. Each spoke is provided with a spoke core member concealed therein.

FIG. 11 (Prior Art) illustrates a boss portion B having a boss 1 and a boss plate 2. The boss plate 2 couples with the core member in each of the respective spokes. In this known steering wheel, whenever an impact force F acts on the steering wheel ring R, the boss plate 2 plastically deforms, thus performing the so-called self alignment by which the plane P is aligned to be normal to the acting direction of the impact force.

The boss plate 2 is constructed of a plate 2a to which the spoke members 4 of the respective spokes are mechanically joined, such as through welding, and a deformable portion 2b, which extends radially to connect the plate 2a and the boss 1 together. The boss plate 2 is also provided with a plastically deformable arm 2c.

In the steering wheel WO, a generally planar core member 4 within the spoke S2 extends from the steel core 3 in the ring portion R from the horizontal plane of the ring portion P to the boss plate 2. Through this arrangement, when an impact force F is exerted on the ring portion R, the spoke core member 4 serves to smoothly transmit the impact force F to the boss plate 2 while resisting any bending movement midway between the portion connected to the ring steel core 3 and the portion connected to the boss plate 2.

As a result, the deformable portion 2b of the boss plate 2 is smoothly plastically deformed so as to realign the ring plane P to be normal to the impact force line of action. However, in the conventional steering wheel, the connected portion of the spoke portion with the ring portion R could not be parallel to the ring R. Therefore, there are many restrictions in design.

SUMMARY OF THE INVENTION

The present invention is directed toward solving the aforementioned problems. The invention provides a steering wheel having a self aligning mechanism and a rear spoke portion which includes a first parallel portion connected to a ring core member and which is parallel to a plane of the ring portion, a kinked portion, a tilted portion, and a second parallel portion connected to a boss plate, wherein when an impact force is exerted on the rear portion of the ring portion, a smooth self alignment is performed while a predetermined amount of energy is absorbed during the self alignment of the ring portion.

A steering wheel according to the present invention is characterized by a steering wheel ring portion, a boss portion disposed at the middle of said ring portion, and a plurality of spokes radially extending outwardly of said boss portion and connecting to said ring portion. The said ring portion includes a ring core member therein, and each of said spokes includes a spoke core member therein, the boss portion includes a boss and a boss plate through which said boss portion is connected to each of said spoke core members and which is plastically deformable to cause the plane of the ring to be at substantially right angles to an impact force line of action whenever the impact force is exerted on the ring portion.

The spoke core members of the spokes disposed at a rear side of the ring comprises a first parallel portion which is substantially parallel to the ring plane and which extends from the ring core member toward the boss portion to a kinked portion, a tilting portion which extends toward said boss plate from the kinked portion to a second parallel portion, the second parallel portion extends toward the boss portion and is connected to the boss plate. One end portion of the second parallel portion of said rear spoke core member extends toward the left and the right sides of said boss, and is securely connected to the underside of the boss plate.

With a steering wheel according to the present invention, the second parallel portion of the rear spoke core member extends to the left and right sides of the boss plate and is there connected to the underside of the boss plate. This construction permits a longer span of the rear spoke core member between the attachment point to the boss plate and the ring core member. The connection of the rear spoke core member to the underside of the boss plate facilitates the downward bending of the rear spoke core member upon applying an impact force.

Although the rear spoke core member includes a natural bending point in that it is provided with both a kinked portion and a first parallel portion, the construction of the steering wheel of the present invention creates a larger bending moment arm acting on the connecting point of the spoke core member to the boss plate. This larger bending moment helps to ensure that the deformation will not be localized at the kinked portion of the spoke core member.

Thus, when the impact force is exerted on the rear portion of the ring, the rear spoke core member will not deform at the kinked portion midway between the first parallel portion and the tilted portion but instead will bend in proximity of the connection to the boss plate, thereby causing the whole ring plane to align substantially normal to the impact force line of action so as to absorb a predetermined amount of energy from that impact force.

DETAILED DESCRIPTION OF THE PREFERRED EMBODIMENTS

Figure 8:
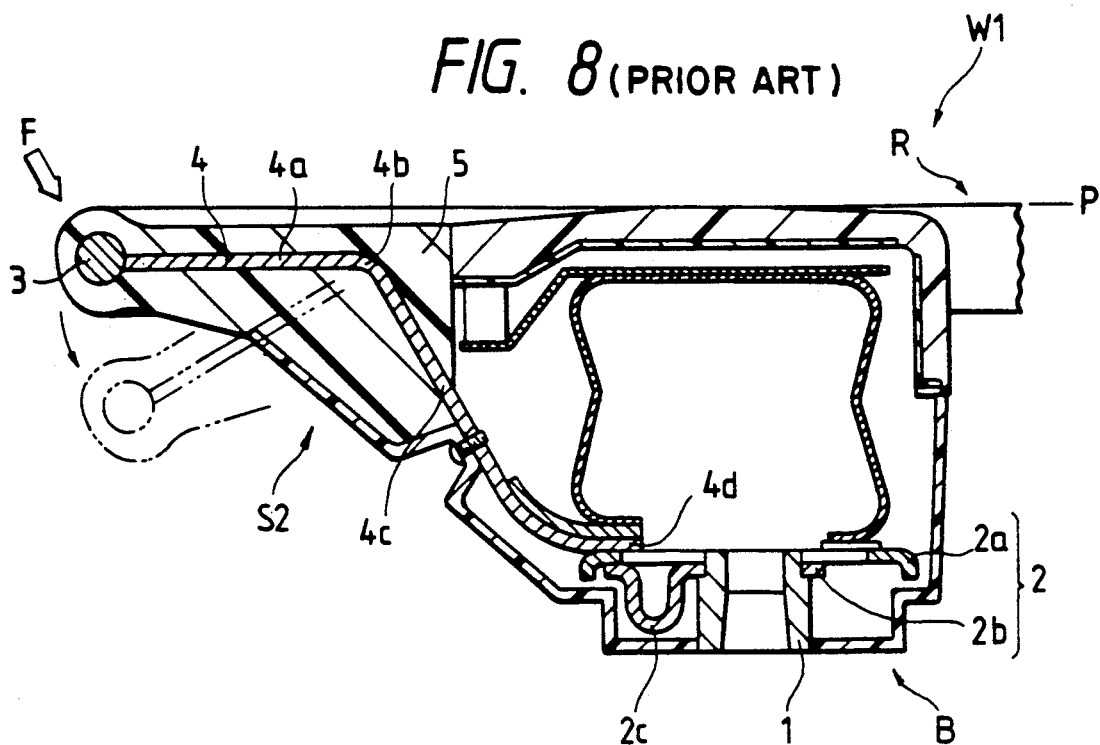
FIG. 8 is a cross-sectional view of a conventional steering wheel.

The steering wheel W1 depicted in FIG. 8 suffers the shortcoming of having the rear spoke core member 4 shaped such that the shape of the spoke S2 thick outer body 5 is configured to the core metal 4. That is, the steering wheel W1 is constructed to have a first portion 4a, extending substantially in parallel with the ring plane P, a kinked portion 4b, a tilted portion 4c, extending from the kinked portion 4b to a second parallel portion 4d, and a second parallel portion extending to a connection with the boss portion.

In the steering wheel W1, when an impact force F is exerted on the rear portion of the ring R, the transmission of the impact force through the spoke core 4 will not cause the deformable portion 2b of the boss plate 2 to deform, but, will instead cause the kinked portion 4b to bend. As the result of this bending, the deformable portion 2b of the boss plate 2 will not be smoothly, plastically deformed, but, rather, the ring core member 3 will be partly deformed. The result of such a combination is a failure of the steering wheel to orient the plane of the ring portion P so as to be normal to the line of action of the impact force F.

Figure 9:
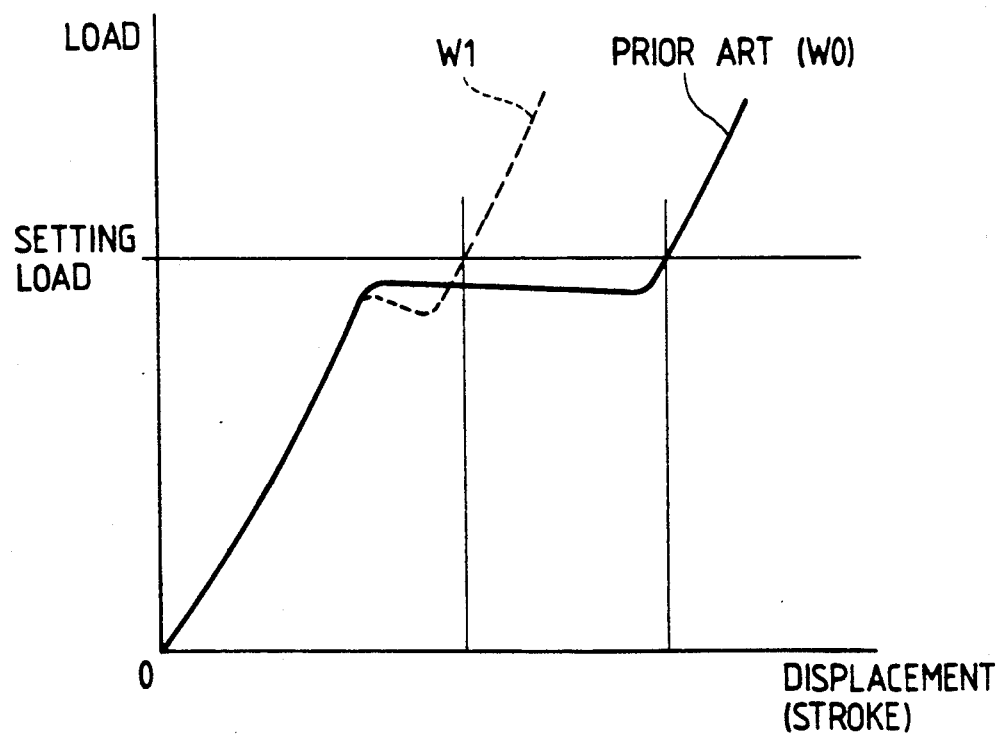
FIG. 9 is a graph in which the applied load is plotted against the displacement for both the steering wheel in FIG. 8 and a prior art steering wheel when the steering wheel is deformed.
Figure 10:
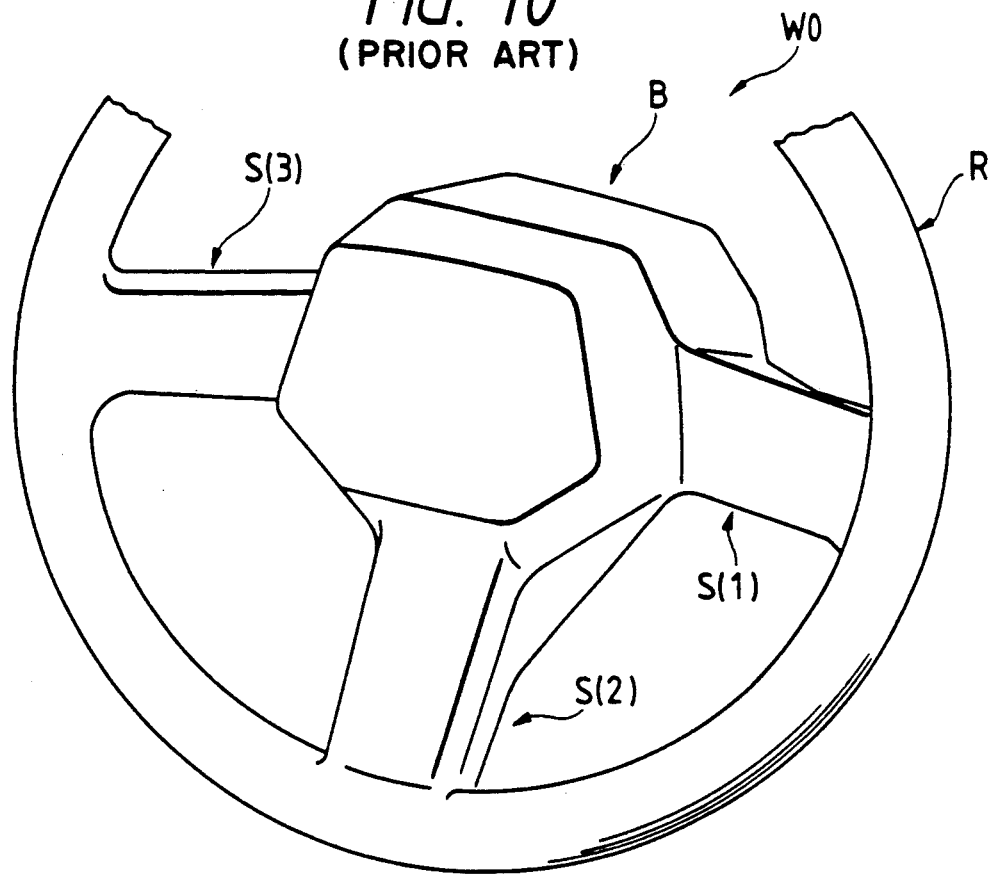
FIG. 10 (Prior Art) is a perspective view of a known steering wheel.

FIG. 9 depicts the load curve of the steering wheel W1 as that steering wheel is deformed by an impact force F acting thereon. This load curve is represented by the dotted line in FIG. 9. As can be seen from the graph, the load curve for the steering wheel W1 abruptly rises after the point that the kinked portion 4b has been bent. This abrupt rise reduces the amount of energy that may be absorbed by the steering wheel W1 within the predetermined load setting. The solid line in FIG. 9 is a load curve of the convention steering wheel W0 being deformed by the application of impact force F. The areas below the respective curves are indicative of the relative amount of energy absorbed during the deformation of the respective steering wheels.

An embodiment of the present invention to be described hereinbelow provides certain advantages over the foregoing structure.

Figure 1:
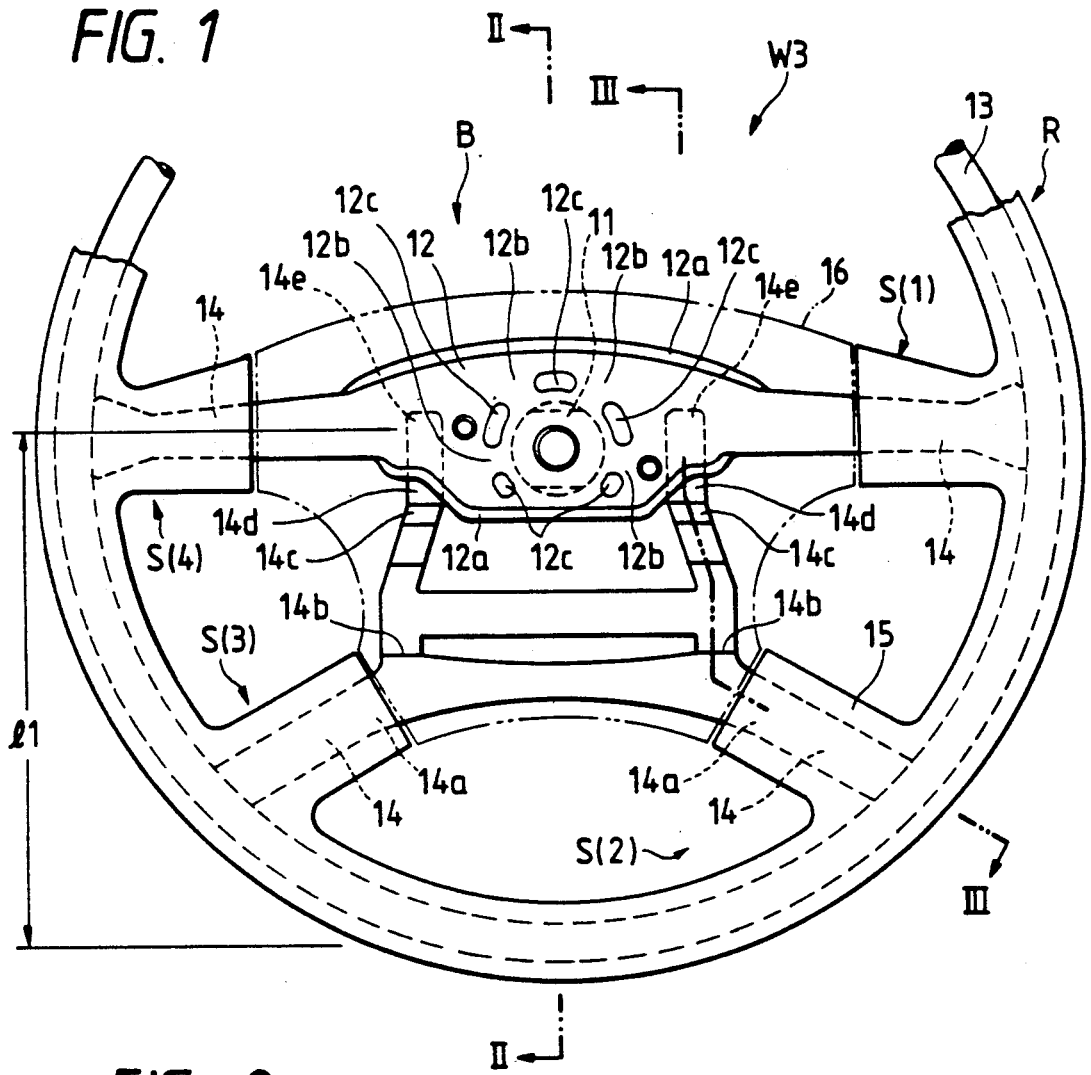
FIG. 1 is a top view of one embodiment of a steering wheel according to the present invention.
Figure 2:
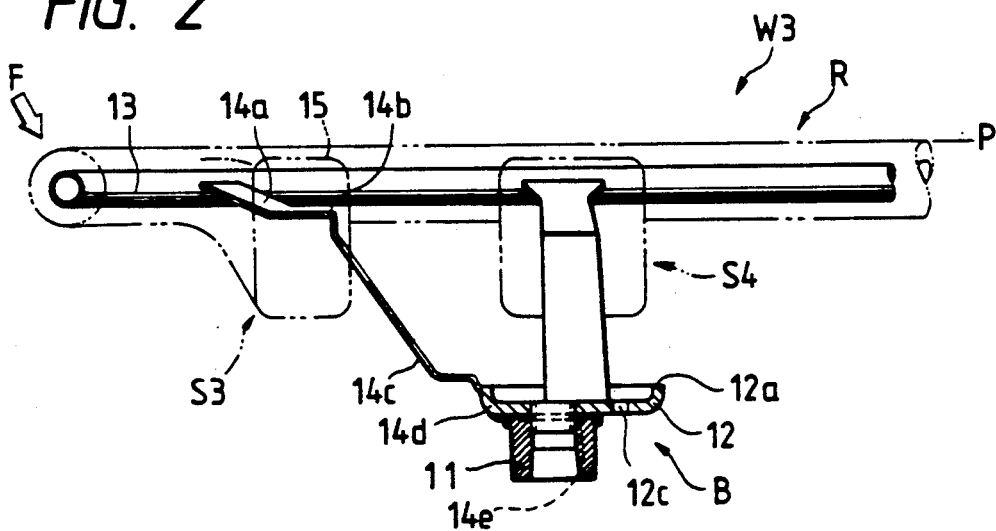
FIG. 2 is a partly omitted cross-sectional view taken along the lines II—II of FIG. 1.
Figure 3:
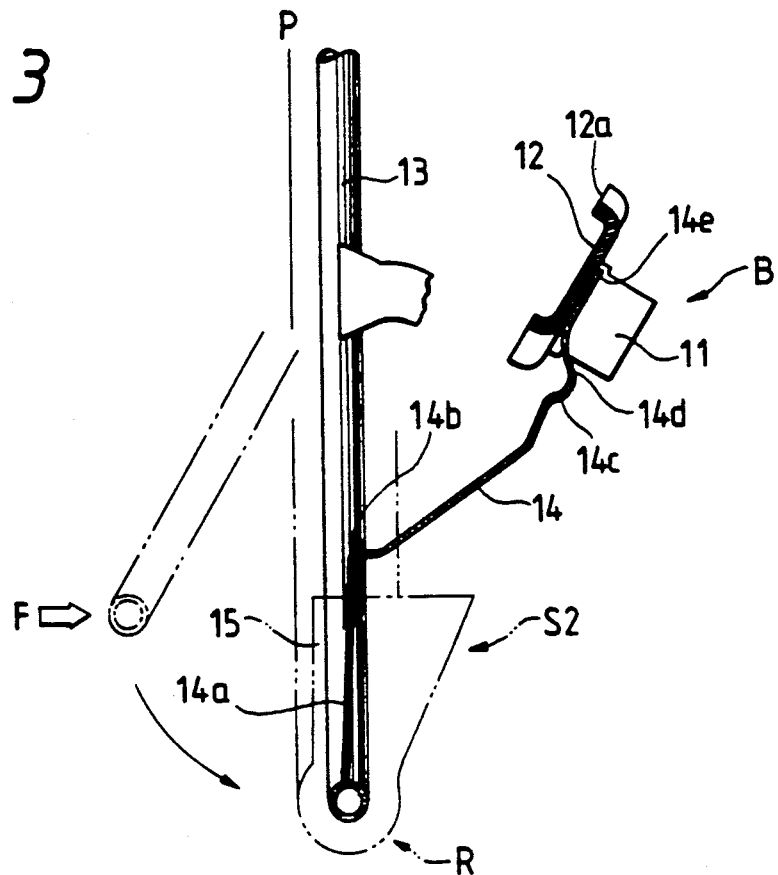
FIG. 3 is cross-sectional view taken along the lines III—III, showing the steering wheel of FIG. 1 when it is deformed.

One embodiment of a steering wheel according to the present invention is shown as W3 in FIGS. 1 through 3. The steering wheel W3 is constructed of a ring portion R, a boss portion B, which is disposed at the middle of the ring R, and a spoke portion S which extends radially outward from the boss B and terminates at a connection with the ring R. The spoke portion S may typically be provided with two front spokes S1 and S2 which extend laterally and two rear spokes S2 and S3 which also extend laterally.

The ring R has a core member 13 therewithin. This core may be constructed of a steel pipe. The respective spokes S1 to S4 are provided with core members disposed therein. These spoke core members may be made of a sheet steel.

The boss B has a boss 11, which is made of steel and is connected to the steering shaft (not shown), and a boss plate 12 made of a sheet steel. The boss plate 12 is formed with a plurality of holes 12c disposed radially around the boss 11 so as to form deformable portions 12b between the holes 12c. The deformable portions 12b tend to plastically deform. Ribs 12a are formed around the boss plate 12. The ribs 12a arise upwardly from the boss plate 12 and are provided to increase the rigidity of the peripheral portion of the boss plate which in turn plays a role in ensuring that it is the deformable portions 12b that are deformed. In this embodiment, the boss plate 12 is made of a sheet of steel which is formed so as to be integrally continuous with the front spokes S1 and S4.

The core members 14 of the two rear spokes S2 and S3 are provided with a first parallel portion 14a that extends parallel to the ring plane P from the ring core member 13 to a kinked portion 14b, a tilted portion 14c which extends toward the boss plate 12 from the kinked portion 14b, and a second parallel portion 14d extending from the tilted portion 14c to a connection with the boss plate 12 at a tip end portion 14e.

The reason why the rear spoke core members 14 are formed with the first parallel portions 14a, is that an outer body 15, which is made of a thick soft synthetic resin and which extends from around the ring core member and covers the spoke core member 14, may be formed in a predetermined shape.

The second parallel portion 14d of the rear spoke core member 14 extends to the left and right sides of the boss 11 on the boss plate 12 so as to mechanically connect the tip end portion 14e to the underside of the boss plate 12. This connection may be made by any known means and may, for example, be made by spot welding. In this embodiment, the two rear spoke core members 14 are made so as to share one integrally continuous kinked portion 14b, and the two rear spoke core members 14 are formed so as to have a thickness which is less than that of the two front spoke core members 14.

In this embodiment, a pad 16 equipped with a horn switch mechanism (not shown) etc. thereon, is disposed across the boss B and the respective spokes S. Below the pad 16 is disposed a lower cover (not shown).

The operation of this embodiment of the steering wheel W3 will now be described in detail as a horizontal impact force F is exerted on the rear side of the ring portion R.

The second parallel portion 14d of the respective rear spoke core members 14 extend to the left and right sides of the boss 11 so as to connect the tip end portion 14e to the underside of the boss plate 12. Therefore, the span $l_1$ from the rear portion of the ring R and on which the impact force F is exerted, to the tip ends 14e of the rear spoke core members, which are connected to the boss plate 12, is longer than the span $l_0$ of the comparison steering wheel (FIG. 5) in which the spoke core members 14 are connected to a side surface of the rib 12a on the rear side of the boss plate 12 i.e., located behind the boss 11. Because the second parallel portion 14d of the rear spoke core member 14 in this embodiment of the present invention is connected at its tip end portion 14e to the underside of the boss plate 12, the respective spoke core members 14 are exposed to a greater bending moment arm at their juncture with the underside of the boss plate 12.

With the steering wheel W3, even though the rear spoke core member 14 is formed with a first parallel portion 14a and a kinked portion 14b, similar to the steering wheel depicted in FIG. 8, a relatively larger bending moment acting on the boss plate 12 at the connection (tip end portion 14e) can be achieved, rendering the rear spoke core member 14 more susceptible to downward deformation much closer to the connection point. Therefore, when the horizontal impact force F is exerted on the rear portion of the ring R of the steering wheel W3, the rear spoke core member 14 will not immediately deform at its kinked portion 14b but, instead, each rear spoke core member will deform in proximity of the tip end portion 14e connected to the boss plate 12. This in turn causes the whole ring plane P to realign so as to be normal to the direction of the impact force F. Thus, a predetermined about of energy of the impact force F may be absorbed.

Figure 5:
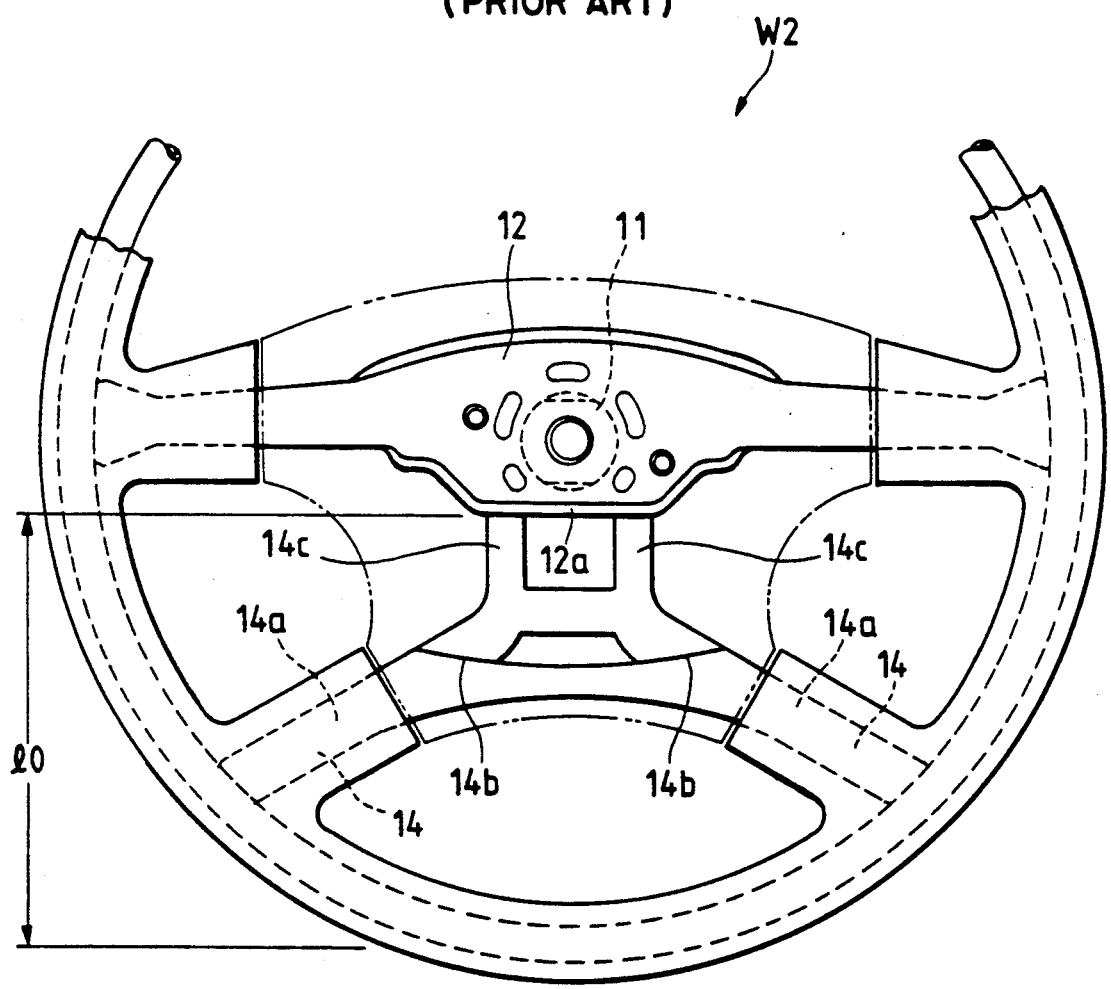
FIG. 5 (Prior Art) is a top view of a known comparison sample.

This embodiment of the steering wheel W3 of the present invention, is now compared to the known steering wheel W2 of FIG. 5 as a comparison sample. The two spoke core members 14 of the steering wheel W2 are welded at their ends to the side surface of the rear rib 12a of the boss plate 12.

Figure 4:
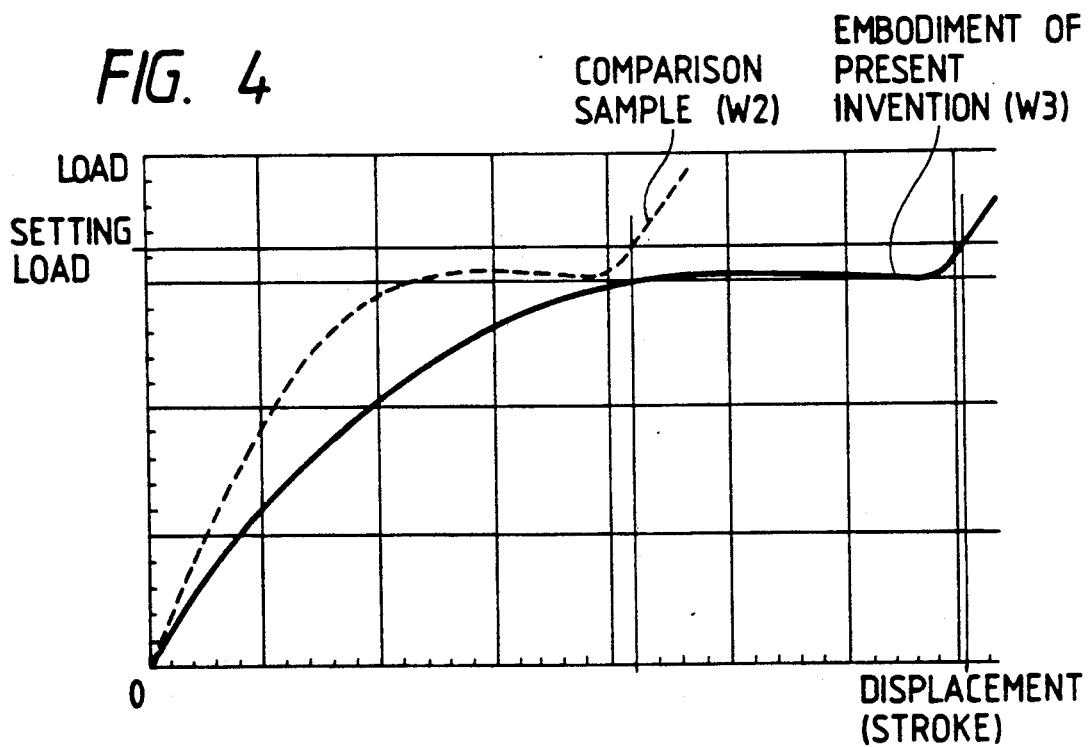
FIG. 4 shows graphs for the embodiment and for the comparison sample, showing the relation between the load and the stroke.

In FIG. 4, the displacement (stroke) of the ring R is plotted against the load when the steering wheel is deformed due to a horizontal impact force F exerted on the rear portion of each of the steering wheels. In both tests, the boss 11 of the respective steering wheels are positioned at an angle of 30° with respect to the horizontal plane. In this graph, the solid line depicts the response of the steering wheel W3 while the dotted line represents the response of the steering wheel W2.

As becomes apparent from study of the curve for the steering wheel W3, the bending of the second parallel portion near the tip end portion 14e of each of the respective rear spoke core members causes the curve to extend laterally so as to allow for a larger stroke. In contrast, it is to be appreciated from study of the curve for the comparison sample steering wheel W2, that the binding moment acting on the portion where the spokes are connected to the boss plate 12 is smaller by an amount corresponding to the shorter span $l_o$, and therefore makes it more difficult for the spokes to bend and absorb impact energy. In fact, the curve for the wheel W2 rises with a steeper slope than the curve for the wheel W3, and begins to bend at the point each of the kinks 14b of the respective rear spoke core members 14 becomes deformed, continues on a flat slope for a short stroke before sharply rising to exceed the setting load.

The area below each of the respective curves represents the amount of energy of the impact force F which is absorbed by that steering wheel. From these areas, it should be understood that the steering wheel W3 absorbs a larger amount of energy within the predetermined load than the steering wheel W2.

When an impact force F is exerted on the ring portion R in the vicinity of the front spoke core member 14, because the front spoke core member 14 is formed so as to be thicker than the rear spoke core member 14 in the W3 embodiment of the present invention, and because it is made of sheet steel and is integrally continuous with the boss plate 12, the boss plate 12 will be plastically deformed at its deformable portion 12b, thereby self-aligning the ring plane P.

Figure 6:
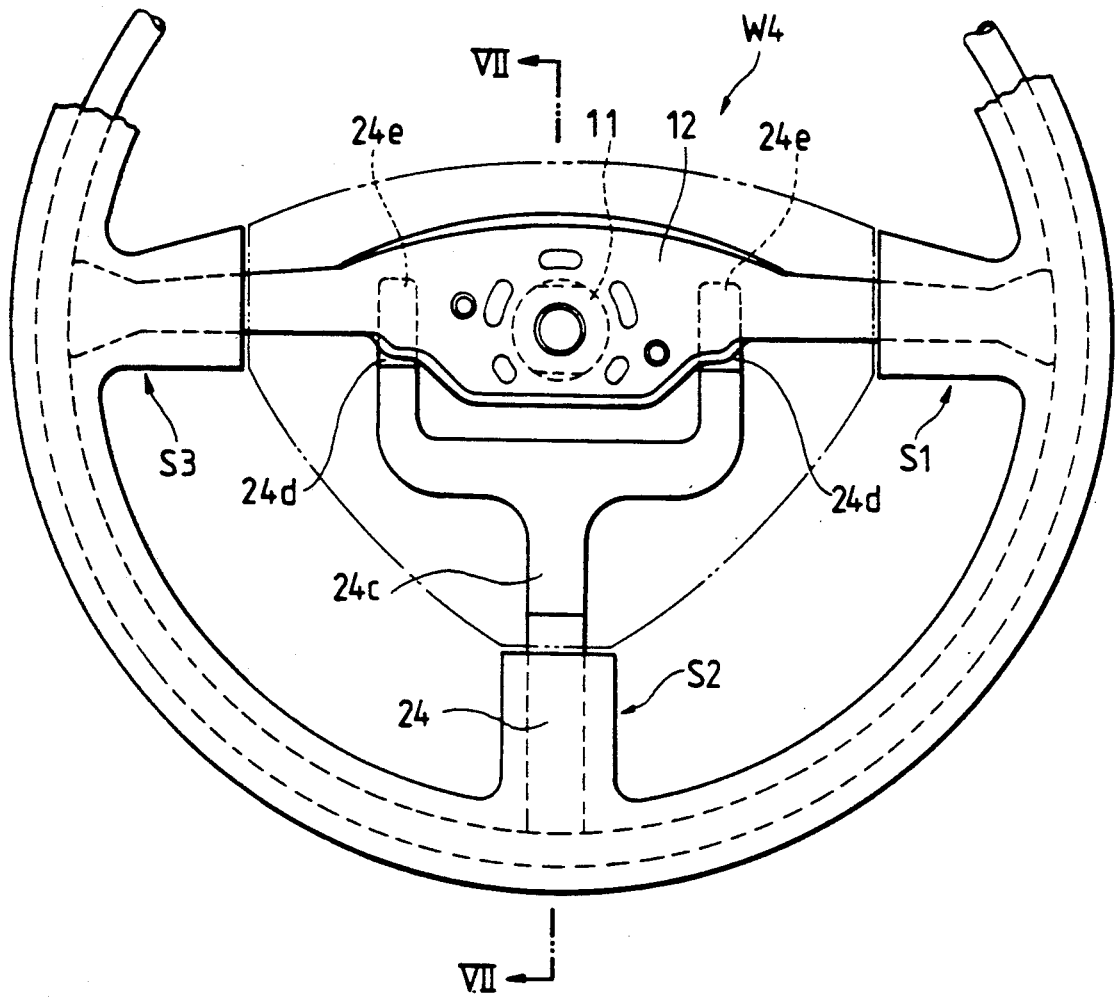
FIG. 6 is a top view of another embodiment of the invention.
Figure 7:
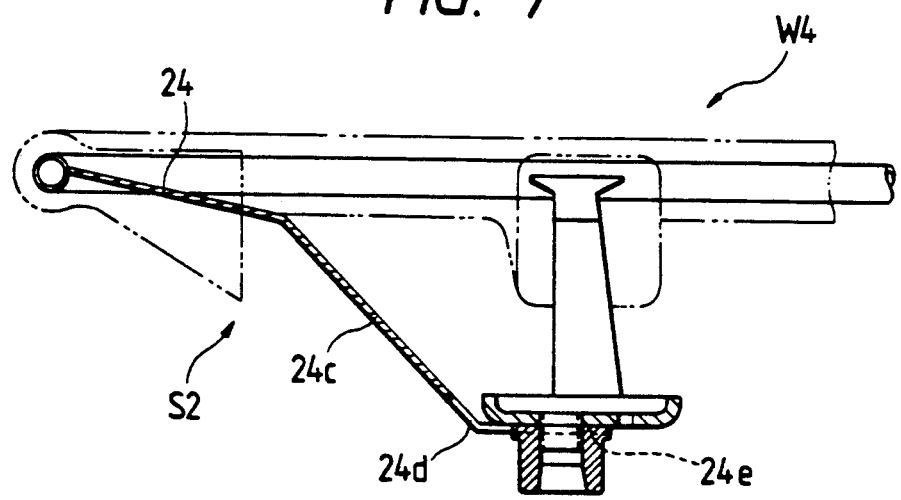
FIG. 7 is a cross-sectional view, partly omitted, taken along the lines VII—VII of FIG. 6.

While the embodiment has been described with respect to the steering wheel W3 where the two spokes S2 and S3 are provided on the rear side of the ring, the present invention may also be applied to the steering wheel W4 having one rear spoke S2, i.e., a total of three spokes as is shown in FIGS. 6 and 7. The steering wheel W4 of the embodiment has a rear spoke which is divided at the distal end of the tilting portion 24c. The second parallel portion 24d is formed on the divided portion whose tip end portions 24e are welded to the underside of the boss plate 12 to the right and left sides of the boss 11, thus exhibiting the same effects and advantages as previously described.

While the embodiment has been described with respect to the construction in which the second parallel portion 14d and 24d of the rear spoke core members 14 are welded at their tip ends 14e and 24e to the boss plate 12, the tip end portions 14e and 24e may also be bolted to the boss plate 12.

Figure 11:
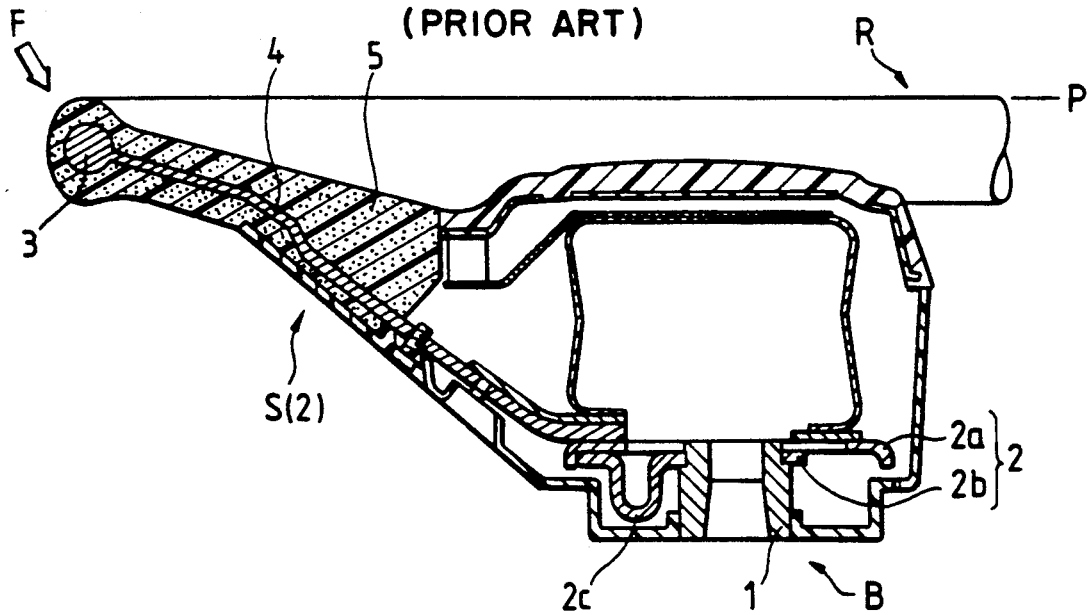
FIG. 11 (Prior Art) is a cross-section view of a known steering wheel.

While the embodiment has been described with respect to the construction in which the boss plate 12 is made of the same sheet so as to be integral with the front spoke core member 14 so as to be integrally continuous with each other, the boss plate 12 may also be constructed of an annular plate 2a and a deformable portion 2b having a deformable arm 2c as shown in FIGS. 8 and 11, so that the front spoke core member 14 may be secured to the boss plate 2 in another way.

What is claimed is:

1. A steering wheel comprising:
   a boss portion disposed at a center of a ring portion of said steering wheel;
   a plurality of spokes radially extending outward of said boss portion and connecting to said ring portion, each of said spokes including a spoke core member therein;
   a ring core member disposed in said ring portion; and
   a boss plate disposed at said boss portion for connecting a boss of said boss portion and each of said spoke core members, said boss plate is capable of plastic deformation whereby a plane of said ring reorients to be at substantially right angles to an impact force line of action whenever said impact force is exerted on said ring portion; wherein each spoke core member includes a first parallel portion which extends substantially parallel to said ring plane from said ring core member toward said boss to a kinked portion, a tilting portion which extends toward said boss plate from said kinked portion to a second parallel portion, said second parallel portion being adapted to plastically deform and including a tip end connected to an underside of said boss plate.

2. A steering wheel as claimed in claim 1, wherein said tip end of said second parallel portion extends toward a right and a left side of said boss.

* * * * *